F. W. Brown,
Soldering Iron.
Nº 77,447. Patented May 5, 1868.
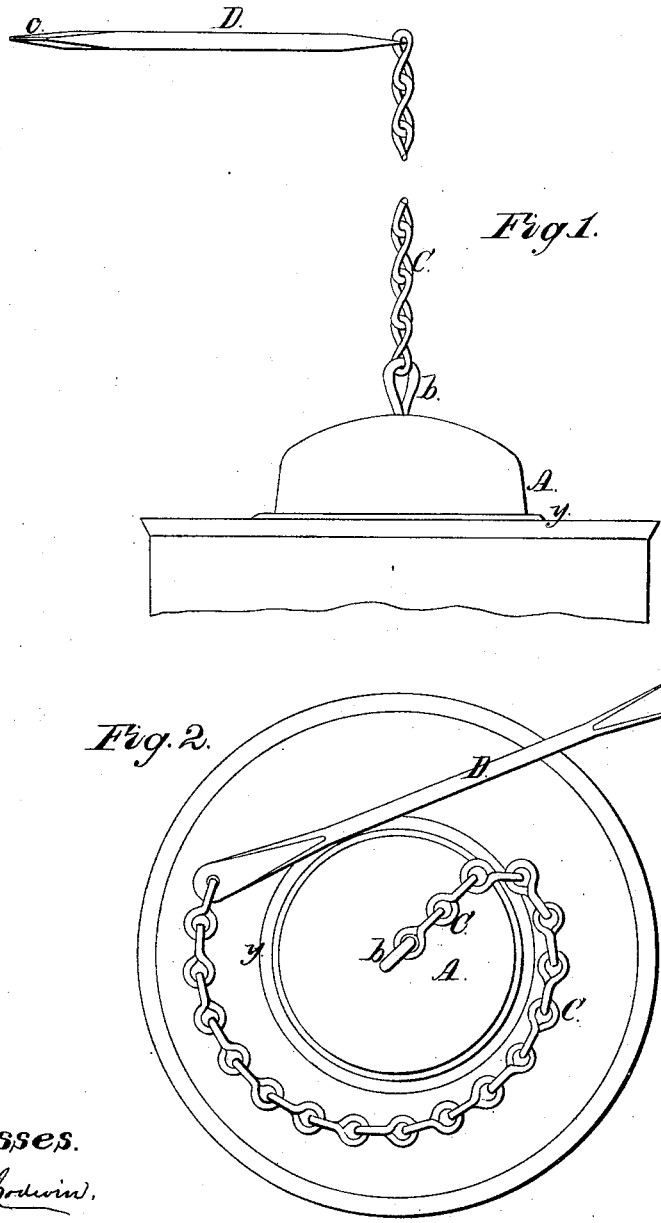
Witnesses.
S. H. H. Godwin.
John Parker
Inventor.
F. W. Brown
By his attorney
H. Howson

United States Patent Office.

FREDERICK W. BROWN, OF PHILADELPHIA, PENNSYLVANIA.

Letters Patent No. 77,447, dated May 5, 1868; antedated April 21, 1868.

IMPROVED DEVICE FOR SOLDERING THE LIDS OF CANS.

The Schedule referred to in these Letters Patent and making part of the same.

TO ALL WHOM IT MAY CONCERN:

Be it known that I, FREDERICK W. BROWN, of Philadelphia, Pennsylvania, have invented a Device for Soldering and Unsoldering the Lids of Fruit-Cans, &c.; and I do hereby declare the following to be a full, clear, and exact description of the same.

My invention consists in the combination, substantially as described hereafter, of a metal block, a sharpened instrument, and a chain, the whole forming a device for facilitating the soldering or unsoldering of the covers of fruit-cans, in the manner hereinafter explained.

In order to enable others to make and use my invention, I will now proceed to describe its construction and operation, reference being had to the accompanying drawing, which forms a part of this specification, and in which—

Figure 1 is a side view of my device for soldering and unsoldering the lids of fruit-cans, &c.; and
Figure 2 a plan view of the same.

A is a circular block, of cast iron or other suitable metal, and is flat on the under side, and rounded, or of other convenient form, on the top, where there is an eye, $b$, to which is attached a chain, C, serving to connect the block to a steel instrument, D, the end, $e$, of which is flattened and sharpened, for a purpose described hereafter.

The block A is somewhat smaller in diameter than the cover, $y$, of the fruit-can, (shown by red lines,) and when it is required to solder this cover to the can, the block is heated and placed upon the centre of the lid, as shown in the drawing.

Resin, or other equivalent material, is then sprinkled upon the cover, near its edge, and the end of a bar of solder is passed around the same, in contact with the heated block A, the latter melting the solder, and at the same time serving as a guide for the bar, and the desired duty of soldering the cover to the can being thus performed with much greater rapidity than by the usual soldering-iron.

After thus soldering the cover, the block is removed to another can, and the operation repeated until the block becomes cool, when it is again heated for further use.

In opening cans, the heated block is permitted to rest upon the cover $y$ until the solder which secures it to the can is melted, then the flat and sharpened end, $e$, of the instrument D is inserted beneath the edge of the lid, and the latter is easily raised and removed.

It will be observed that the instrument D performs the twofold duty of serving as a handle, by which the heated block may be manipulated, and as a tool for aiding in the removal of the cover.

I claim as my invention, and desire to secure by Letters Patent—

The combination, substantially as described, of the block A, instrument D, and chain C, for the purpose specified.

In testimony whereof, I have signed my name to this specification in the presence of two subscribing witnesses.

F. W. BROWN.

Witnesses:
CHAS. B. PRICE,
CHARLES E. FOSTER.